United States Patent

Craft et al.

[11] 3,924,169
[45] Dec. 2, 1975

[54] MIXER WITH SPEED CONTROL

[75] Inventors: Lewis John Craft, Villa Park; Leon M. Roszyk, Downers Grove; John M. Stipanuk; Eugene B. Szymczak, both of Glen Ellyn, all of Ill.

[73] Assignee: Sunbeam Corporation, Chicago, Ill.

[22] Filed: Jan. 14, 1974

[21] Appl. No.: 433,164

[52] U.S. Cl. .......... 318/354; 318/386; 318/245; 259/DIG. 19; 318/252; 318/351
[51] Int. Cl.² .......................................... H02P 7/08
[58] Field of Search .......... 318/305, 351, 336, 354, 318/386, 424, 245, 252; 259/DIG. 35, DIG. 19

[56] References Cited
UNITED STATES PATENTS
2,644,062  6/1953  Williams ................ 318/351
3,596,161  7/1971  Swanke ................. 318/351

Primary Examiner—Robert K. Schaefer
Assistant Examiner—John J. Feldhaus
Attorney, Agent, or Firm—George R. Clark; Neil M. Rose; Clifford A. Dean

[57] ABSTRACT

A food mixer having speed control means including a first switch having a series of speed positions and a switch lever movable in the mixer handle forwardly and rearwardly thereof and a second momentary switch adapted when actuated to provide an increase in speed and torque in any speed position of the first switch with the second switch lever being pivotally mounted on the mixer handle for convenient actuation independently of the first switch lever.

10 Claims, 6 Drawing Figures

MIXER WITH SPEED CONTROL

BACKGROUND OF THE INVENTION

1. Field of the Invention

Our present invention pertains to a food mixer having a speed control including a first multi-speed switch and a second momentary switch which, when activated, provides an instantaneous increase in speed and power in any speed position of the first switch.

2. Description of the Prior Art

While multi-speed food mixers are known to be old in the art, applicants are unaware of any prior art patents which disclose such a multi-speed food mixer having a second switch which when activated provides an instant increase in speed and power in any speed setting of the food mixer.

SUMMARY OF THE INVENTION

The present invention is concerned with a multi-speed food mixer having a unique speed control which provides an instant increase in speed and power in any speed setting of the mixer. It has been determined that the power increases vary from approximately 80 percent at the lowest speed setting to approximately 20 percent at the highest speed setting. With the new and novel food mixer speed control of our present invention, a person using this mixer is provided with the ability to instantaneously increase the speed and power of same should the food being mixed, such as a batter or dough mixture, become of such a heavy consistency that it would otherwise tend to slow down the mixer. The speed control can be activated very simply and quickly through pressure by the thumb on the switch lever and the speed can be reduced just as quickly should there be some unexpected spattering of the food material being mixed. Momentary changes of speed during any mixing operation have also been found to provide a more effective mixing operation. The switch lever of the momentary speed control can be actuated much more quickly than switching back and forth the lever of the multi-speed switch.

As will be described in greater detail herein, this food mixer with speed control comprises a housing having a handle spaced above the housing and formed integrally with a vertical post provided on the upper portion of the housing. An electric motor in the housing is drivingly connected to rotate a pair of whippers and means for ejecting the whippers for cleaning and storage is also provided. The speed control comprises a first rotary switch having a plurality of speed positions with a control lever therefor extending upwardly through the top of the vertical post portion of the housing, the control lever being pivotally actuated in a direction forwardly and rearwardly in the handle, and a second momentary slide switch which is connected in the motor circuit by means of either a diode or a tap connection to a primary coil of the motor field. A switch lever for the momentary slide switch is pivotally mounted on the forward end of the vertical post of the housing whereby downward pressure thereon actuates the momentary switch through a switch link which is connected at its lower end to the actuating button of the switch and which extends upwardly through the top of the vertical post and into abutting engagement with the underside of the switch lever. The momentary switch lever has a slot formed therein which accomodates the switch lever of the rotary switch. With this motor speed control, actuation of the momentary switch lever provides an instantaneous increase in speed and power of the mixer motor in any position in which the rotary switch is set.

It is an object of the present invention to provide a new and novel food mixer with speed control.

It is another object of the present invention to provide such a food mixer wherein the speed control comprises a first switch having a series of speed positions and a second momentary switch which is adapted, when actuated, to provide an increase in the speed and power of the mixer motor in any speed position of the rotary switch.

A further object of the present invention is to provide such a food mixer with speed control wherein both the rotary switch and the momentary switch are mounted adjacent one another on the same switch bracket provided in the mixer housing.

A still further object of the present invention is to provide such a food mixer speed control wherein actuation of the momentary switch shorts out either a portion of the primary coil of the motor field or a diode which is connected in series with the primary coil of the motor field whereby to increase the speed and power of the motor.

Another object of the present invention is to provide such a food mixer wherein the power increases resulting from actuation of the momentary switch may vary from 20 percent to 80 percent depending on the particular speed position of the rotary multi-speed switch.

Still another object of the present invention is to provide such a food mixer with speed control wherein the switch lever for the momentary switch is pivotally mounted on the handle of the mixer for convenient actuation by the user of the mixer and wherein the control lever for the rotary multi-position switch extends upwardly through a longitudinally extending slot formed in the momentary switch lever whereby a facilitate initial selection of a mixing speed for a particular food mixing operation.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWINGS

For a better understanding of the present invention, reference may be had to the accompanying drawings in which:

FIG. 3 is a partial transverse vertical sectional view taken generally along the line 3—3 of FIG. 2;

FIG. 4 is an enlarged side elevational view of the switch assembly with portions of the momentary and rotary switches broken away;

FIG. 5 is an electrical circuit diagram of a food mixer speed control embodying our invention; and FIG. 6 is a partial electrical circuit diagram of another embodiment of a food mixer speed control of our invention.

DESCRIPTION OF THE PREFERRED EMBODIMENTS

Figure 1:
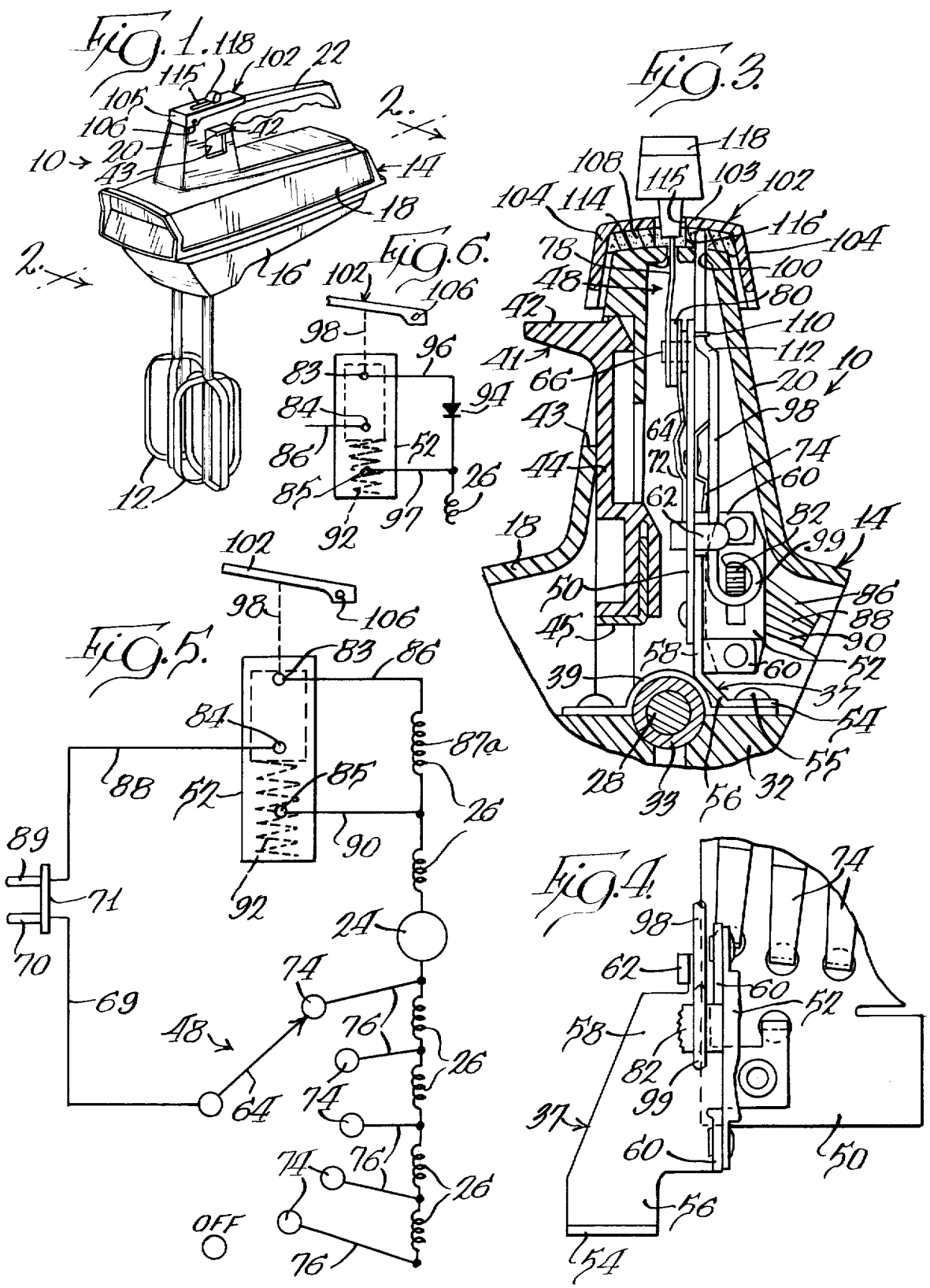
FIG. 1 is a perspective view of a hand held food mixer with speed control embodying our invention.
Figure 2:
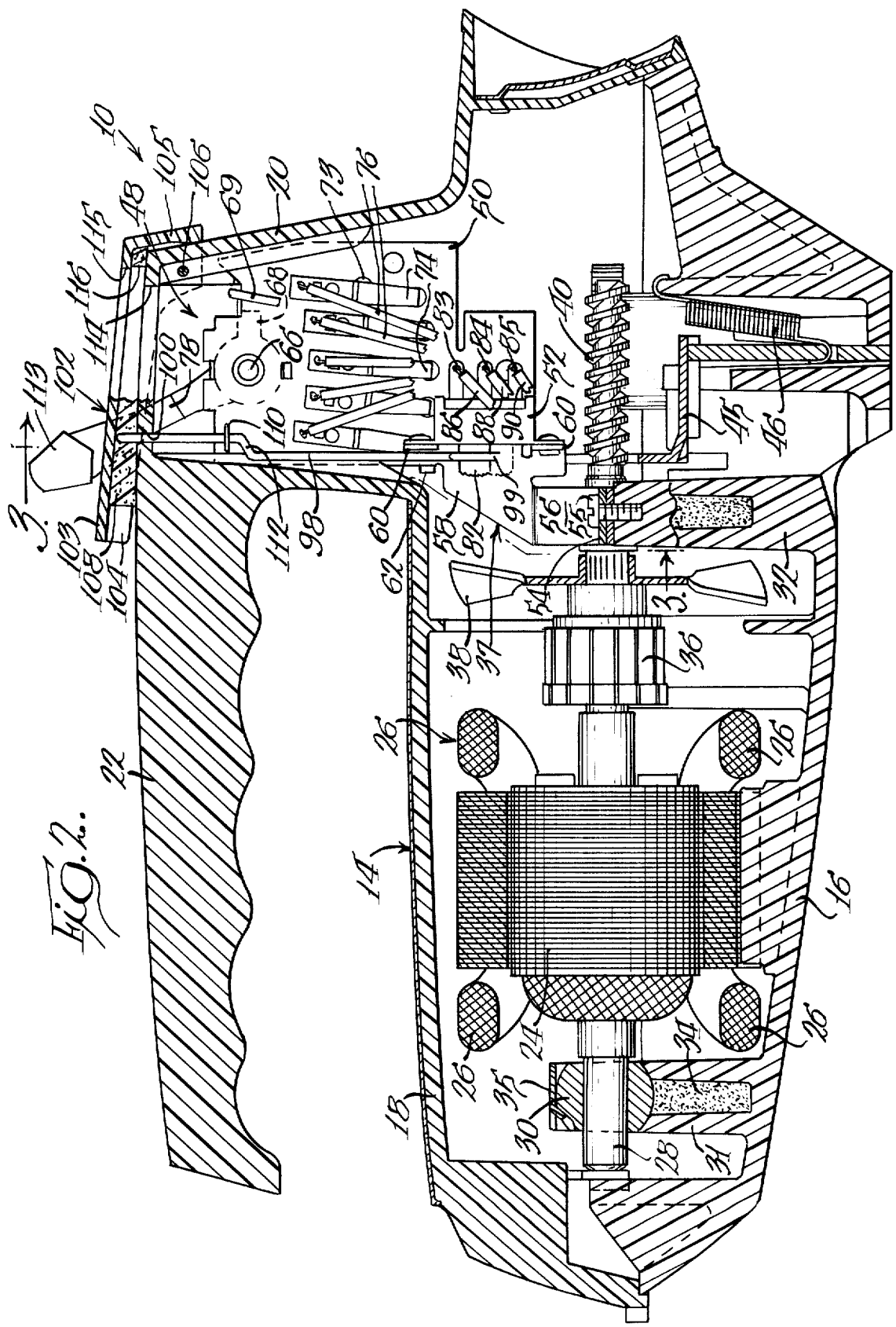
FIG. 2 is an enlarged longitutinal vertical sectional view taken through the food mixer of FIG. 1 with the whipper elements removed.

Referring now to the drawings in which like parts are designated by like numerals in the various views, there is shown FIG. 1 a hand held food mixer with speed control, designated generally by reference numeral 10, which embodies our invention. As shown in FIG. 1, the food mixer 10 is provided with a pair of removable beaters or whippers 12. As best illustrated in FIG. 2, the food mixer with speed control 10 is characterized by a housing 14 which is formed of a lower housing shell 16 and an upper housing shell 18 with the two shells being secured together by suitable fasteners in a manner well known in the art. The upper housing shell 18 is formed at its forward end with the hollow vertical post 20. Projecting rearwardly from the upper end of the vertical post 20 is an integral handle 22 which is spaced above the upper surface of the upper shell 18 to facilitate holding the food mixer 10 when same is being used in a food mixing operation.

An electric motor 24 is suitably mounted in the lower housing shell 16 and has a field coil assembly 26 and an armature shaft 28 which extends longitudinally of the housing 14. The rear end of the shaft 28 is rotatably supported in a bearing member 30 which is mounted in an upstanding bearing support member 31 formed integrally with the lower shell 16. An impregnated bearing wick 34 is provided in the support member 32 and a bearing retainer 35 is provided to retain the bearing 30 in the support member 32. A second bearing 33, which is hidden by a switch bracket 37 in FIG. 2 but is shown in FIG. 3, is provided for the forward portion of the armature shaft 28. A bearing retainer 39 is provided for the bearing 33 which is mounted on a bearing support 32. Mounted on the armature shaft between the motor 24 and the forward bearing 33 is a commutator 36 which, although not visible in FIG. 2, has a pair of brushed associated therewith. A fan 38 is mounted on the armature shaft forwardly of the commutator 36. The forward end of the armature shaft 28 has a worm 40 formed thereon which is adapted to drive a pair of worm gears which are not visible in FIG. 2 but which serve to rotate the whippers 12 in a manner well known in the art.

Although it forms no part of our present invention, the food mixer with speed control 10 is provided with a known type whipper ejection mechanism which comprises an inverted generally L-shaped vertically movable ejector member 41 having a manually engageable horizontal leg portion or actuating button 42 projecting outwardly through a vertical slot 43 provided in a side wall of the hollow vertical post 20 and a vertical leg portion 44 which extends downwardly within the hollow post 20 into engagement with the upper end of an ejector link 45, which link 45 is biased upwardly by an ejector spring 46.

The basic or primary mixing speed for the motor 24 is controlled by a rotary switch 48 having in the embodiment illustrated, five speed positions and an "off" position. The rotary switch 48, as best illustrated in FIGS. 2 and 3, is characterized by a switch plate 50 formed of non-conductive material which is mounted on the switch bracket 37. The switch bracket 37 is of an irregular shape and is adapted to support not only the rotary switch plate 50 but also a momentary slide switch 52, the purpose for which will be described hereinafter. The bracket 37 has a horizontally disposed base portion 54 which is seated on a portion of the bearing retainer 39 and secured to the bearing support 32 by a fastener 55, an upwardly inclined portion 56, and a forwardly and upwardly extending vertical mounting portion 58, which latter portion 58 is provided with a pair of vertically spaced laterally extending mounting ears 60 and a laterally extending guide tab 62 which is spaced rearwardly of the uppermost ear 60 for a purpose to be described hereinafter. A lower corner of the rotary switch plate 50 is suitably mounted on the vertical mounting portion 58 of the bracket 37 whereby the switch plate 50 is disposed in a longitudinal plane within the hollow vertical post 20.

A switch contact arm 64 formed of conducting material has its upper end pivotally mounted on the upper portion of the switch plate 50 by a shoulder rivet 66. The upper end of the arm 64 has a terminal portion 68 which is connected by a lead wire 69 to one contact 70 of a terminal board 71 which is adapted to receive the socket portion of a standard power cord. The arm 64 is provided with a detent 72 which is resiliently engageable in a series of six arcuately arranged holes 73 formed in the switch plate 50 upon pivotal movement of the arm 64. The forwardmost detent hole 73 corresponds to the "off" position of the switch 48 with the rearmost detent hole 73 corresponding to the highest speed position of the rotary switch 48. Associated with each of the detent holes 73, except the "off" position detent hole, is a contact blade 74, which contact blades are connected by lead wires 76 to an appropriate speed tap of the field coil assembly 26.

An upwardly projecting switch lever 78 is secured to the upper end of the contact arm 64 through an insulating member 80 whereby forward movement of the switch lever 78 through an arc actuates the switch 48 from the "off" position to one of its speed positions in a manner known in the mixer art.

The momentary slide switch 52 is mounted on the switch bracket 37 between the two mounting ears 60 with a vertically movable actuating button 82 thereof projecting rearwardly between the two ears 60. The momentary slide switch 52 has three terminals 83, 84, and 85 with the terminal 83 being connected by a lead wire 86 to one end of a primary coil 87a, 87b of the field coil assembly 26. The terminal 84 is connected by a lead wire 88 to the other contact 89 of the terminal board 71 and the terminal 85 is connected by a lead wire 90 to a tap between the two primary coil portions 87a and 87b of the field coil assembly 26. An internal spring 92 in the momentary slide switch 52 normally biases the switch 52 into its uppermost position as shown in the circuit diagram of FIG. 5 whereby the full primary coil 87a, 87b is connected in the motor speed control circuit. However, when the momentary switch 52 is actuated by moving the button 82 downwardly, the portion 87a of the primary coil is shorted out of the circuit whereupon the motor speed and torque are instantaneously increased to provide more power to the mixer 10 no matter which speed position the rotary switch 48 is in without the necessity of changing the speed position of the rotary switch 48. Tests have shown that this power increase varies from approximately 80 percent in the lowest speed postion of the rotary switch 48 to approximately 20 percent in the highest speed position of the rotary switch 48. This "spurt of power" arrangement is very advantageous to one using the food mixer 10 if the consistency of the food material, such as batter or dough, being mixed suddenly becomes thick enough to slow down the motor 24. Momentary increases in the motor speed through actuation of the switch 52 also provides a more effective mixing operation.

In the alternative circuit embodiment partially shown in FIG. 6, a diode 94 is connected in series with the field coil assembly 26 with one side of the diode 94 being connected through a lead wire 96 to the terminal 83 of the momentary slide switch 52 and the other side of the diode 94 being connected through a lead wire 97 to the terminal 85 of the switch 52. The portion of the circuit not shown in FIG. 6 is identical to the circuit of FIG. 5. Thus, when the momentary slide switch 52 is actuated, the diode 94 is shorted out of the circuit and the motor speed and torque are instantaneously increased to provide generally the same spurt of power results as in the primary coil tap arrangement of the circuit of FIG. 5.

Actuation of the momentary slide switch 52 is accomplished by the provision of a plunger-like switch link 98 which is disposed vertically in the hollow vertical post 20 with its lower end bent or looped around the switch button 82, as shown at 99, and with its upper end projecting upwardly through a hole 100 provided in the top of the vertical post 20. The upper end of the switch line 98 abuts the underside of a switch lever 102 which overlies the top of the vertical post 20. The switch lever 102 is characterized by a top wall 103, depending side walls 104, and a depending front wall 105. The forward end of the switch lever 102 is pivotally mounted on the front portion of the vertical post 20 by a pivot pin 106 which passes through the side walls 104 at the forward ends thereof. The rear edge of the switch lever 102 is normally spaced above the top surface of the vertical post 20 or the handle extension 22 thereof approximately one-quarter of an inch by a foam pad 108 which is disposed between the underside of the switch lever 102 and the top of the vertical post 20. The pad 108 may be adhesively attached to either one or both of these surfaces. The upper end of the switch link 98 abuts the underside of the switch lever 102 toward the rear end thereof for obvious reasons. When the rear end of the switch lever 102 is depressed, the momentary slide switch 52 is actuated to provide the spurt of power described herein. Upward pivoting movement of the switch lever 102 is limited by engagement of the depending front wall 105 thereof with the front surface of the vertical post 20.

The lower end of the switch link 98 is guided between the guide tab 62 and the adjacent mounting ear 60 with an upper portion of the switch link 98 being guided by a wire loop 110 carried on the switch plate 50. For clearance purposes, the switch link 98 may have an offset bend formed therein, as at 112 in FIGS. 2 and 3.

The top wall of the vertical post 20, the top wall 103 of the switch lever 102, and the foam pad 108 are provided with aligned longitudinally extending slots 114, 115 and 116, respectively, to accommodate passage therethrough of the upper end of the rotary switch lever 78 and to permit forward and rearward pivotal actuation thereof. A switch knob 118 is mounted on the upper end of the rotary switch lever 78 to facilitate movement thereof. Suitable markings may be provided on the upper surface of the switch lever 102 alongside of the slot 115 to indicate the several speed positions of the rotary switch 48. It is noted that the foam pad 108 not only provides a soft action for the switch lever 102, but also serves as a seal to prevent dust and debris from entering the interior of the mixer housing 14.

While there has been shown and described two alternative embodiments of the present invention, it will be apparent to those skilled in the art that further changes and modifications may be made without departing from the invention in its broader aspects and it is, therefore, contemplated in the appended claims to cover all such changes and modifications that fall within the true spirit and scope of the present invention.

What is claimed as new and desired to be secured by Letter Patent of the United States is:

1. A food mixer with speed control comprising a housing, an electric motor mounted in said housing and adapted for driving food mixing means carried by said housing, and housing being provided with a handle portion, an electrical power and control circuit for said motor, a first multi-speed rotary switch for said motor connected in said circuit and having a plurality of speed positions, a second normally-open momentary switch connected in said circuit, said power and control circuit being characterized by a field coil assembly of said motor having a primary coil, a portion of which coil is adapted to be shorted out upon actuation of said second switch whereby to instantaneously increase the speed of said motor when said first rotary switch is in any one of said speed positions, a switch lever for said momentary switch pivotally mounted on said handle portion for downward actuating movement relative to said handle portion, vertically aligned longitudinally extending slots formed in the top surface of said handle portion and in said momentary switch lever, and a pivotally mounted control lever for said rotary switch which projects upwardly through said aligned slots for actuating movement forwardly and rearwardly therein.

2. A food mixer with speed control comprising a housing having a handle portion, an electric motor mounted in said housing and having a field coil assembly associated therewith, a power and control circuit for said motor, a multi-speed rotary switch mounted in said housing and connected in said circuit, said rotary switch having a plurality of contacts each of which is connected to a separate speed tap of said field coil assembly, a momentary slide switch mounted in said housing and connected in said circuit and adapted when actuated to instantaneously increase the speed of said motor, a switch lever for said momentary switch overlying the forward portion of said handle poriton and pivotally connected at its forward end to said handle portion, a switch link having its lower end connected to an actuating button of said momentary switch and its upper end projecting upwardly through an opening provided in the upper surface of said handle portion into abutting engagement with the underside of said switch lever toward the rear end thereof with said rear end of said switch lever being biased by said momentary switch through said switch link into a slightly raised position above the upper surface of said handle portion, aligned longitudinally extending slots formed in the upper surface of said handle portion and in said momentary switch lever, and a pivotally mounted actuating lever for said rotary switch projecting upwardly through said aligned slots for forward and rearward movement therein.

3. The food mixer with speed control of claim 2 wherein said field coil assembly is characterized by a primary coil, and wherein a portion of said primary coil is shorted out of said power and control circuit by said momentary switch upon actuation thereof as a result of downward pressure applied to said switch lever whereby to provide said instantaneous increase in motor speed.

4. The food mixer with speed control of claim 2 wherein a foam pad is disposed between the upper surface of said handle portion and the underside of said switch lever whereby to cushion actuation of said switch lever, said foam pad being slotted to accomodate said actuating lever of said rotary switch.

5. The food mixer with speed control of claim 2 wherein said switch lever is characterized by a top wall portion, by depending side wall portions, and by a depending front wall portion, upward pivoting movement of said switch lever being limited by engagement of said depending front wall portion with a front end surface of said handle portion.

6. A food mixer with speed control comprising a housing having a handle portion, an electric motor mounted in said housing and having a field coil assembly including a primary coil associated therewith, a power and control circuit for said motor, a multi-speed rotary switch mounted in said housing and connected in said circuit, said rotary switch having a plurality of contacts each of which is connected to a separate speed tap of said field coil assembly, a momentary slide switch mounted in said housing and connected in said circuit and adapted when actuated to short out a portion of said primary coil whereby to instantaneously increase the speed of said motor in any position of said rotary switch, a switch lever for actuating said momentary switch overlying the forward portion of said handle portion and pivotally connected at its forward end to said handle portion, aligned longitudinally extending slots formed in the upper surface of said handle portion and in said momentary switch lever, and a pivotally mounted actuating lever for said rotary switch projecting upwardly through said aligned slots for forward and rearward movement therein.

7. The food mixer with speed control of claim 6 wherein an angular bracket is mounted in said housing, and wherein both said rotary switch and said momentary slide switch are mounted on said bracket.

8. The food mixer with speed control of claim 7 wherein a switch link extends generally vertically between the underside of said momentary switch lever and actuating button of said momentary switch, wherein a foam pad is disposed between the underside of said switch lever and the upper surface of said handle portion, downward pressure applied to the rear end of said switch lever serving to actuate said momentary switch.

9. The food mixer with speed control of claim 8 wherein guide means are provided on said bracket and on said rotary switch for said switch link of said momentary switch.

10. A food mixer with speed control comprising a housing, an electric motor mounted in said housing, a field coil assembly associated with said motor and characterized by a plurality of speed control coils and by a coil separate therefrom, an electrical power and control circuit for said motor, first speed control switch means connected in said circuit and having a plurality of speed positions wherein different combinations of said plurality of coils are interconnected in said circuit, second normally closed momentary speed control switch means connected in said circuit and adapted when actuated during operation of said motor to cut out said separate coil of said field coil assembly whereby to instantaneously and momentarily increase the speed of said motor when said first speed control switch means is in any one of said speed positions, and separate independently operable actuator means for said first speed control switch means and said second momentary speed control switch means.

* * * * *

UNITED STATES PATENT OFFICE
CERTIFICATE OF CORRECTION

Patent No. 3,924,169　　　　　　　Dated　December 2, 1975

Inventor(s) Lewis John Craft, Leon M. Roszyk, John M. Stipanuk, Eugene B. Szymczak It is certified that error appears in the above-identified patent and that said Letters Patent are hereby corrected as shown below:

Column 3, line 6 - after "shown" insert --in--.

Column 3, line 39 - after of, "brushed" should be --brushes--.

Column 5, line 26 - "line" should be --ink--.

Column 6, line 16 - "and" should be --said--.

Column 8, line 10 - after "and" insert --an--.

Signed and Sealed this sixth Day of April 1976

[SEAL]

Attest:

RUTH C. MASON
*Attesting Officer*

C. MARSHALL DANN
*Commissioner of Patents and Trademarks*